US008914073B2

(12) United States Patent
Nomachi et al.

(10) Patent No.: US 8,914,073 B2
(45) Date of Patent: Dec. 16, 2014

(54) MOBILE ELECTRONIC DEVICE, DISPLAY CONTROL METHOD AND STORAGE MEDIUM STORING DISPLAY CONTROL PROGRAM

(75) Inventors: Nayu Nomachi, Yokohama (JP); Takayuki Sato, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 198 days.

(21) Appl. No.: 13/634,438

(22) PCT Filed: Mar. 16, 2011

(86) PCT No.: PCT/JP2011/056297
§ 371 (c)(1),
(2), (4) Date: Sep. 12, 2012

(87) PCT Pub. No.: WO2011/115186
PCT Pub. Date: Sep. 22, 2011

(65) Prior Publication Data

US 2013/0005406 A1 Jan. 3, 2013

(30) Foreign Application Priority Data

Mar. 16, 2010 (JP) ................................ 2010-059511

(51) Int. Cl.
*H04B 1/38* (2006.01)
*H04M 1/725* (2006.01)
*G06F 3/0482* (2013.01)
*G06F 3/01* (2006.01)
*H04M 1/02* (2006.01)
*H04M 1/2745* (2006.01)

(52) U.S. Cl.
CPC ......... *H04M 1/72522* (2013.01); *G06F 3/0482* (2013.01); *G06F 3/017* (2013.01); *H04M 1/0233* (2013.01); *H04M 1/72552* (2013.01); *H04M 2250/60* (2013.01); *H04M 1/274583* (2013.01); *G06F 2200/1637* (2013.01); *H04M 2250/12* (2013.01)
USPC .......................................... 455/566; 345/156

(58) Field of Classification Search
USPC ............ 455/566, 550.1, 575.1; 345/156, 419, 345/204; 715/864
See application file for complete search history.

(56) References Cited

U.S. PATENT DOCUMENTS 8,230,361 B2 * 7/2012 Goldberg et al. ............. 715/815
8,542,110 B2 * 9/2013 Choi ........................ 340/539.11
2006/0094480 A1 * 5/2006 Tanaka ....................... 455/575.1

* cited by examiner

*Primary Examiner* — Sonny Trinh
(74) *Attorney, Agent, or Firm* — Lowe Hauptman & Ham, LLP

(57) ABSTRACT

According to an aspect, a mobile electronic device includes a display unit and a control unit. The display unit has a display area for displaying a plurality of objects. The control unit is configured to display the objects in a first arrangement in the display area, move the objects displayed in the first arrangement outward from inside the display area, and display the objects moved outward of the display area again in the display area in a second arrangement.

12 Claims, 5 Drawing Sheets

START
DISPLAY MEMOS ON IDLE SCREEN S2
IS TILTING DETECTED? S4
NO
YES
OBTAIN NUMBER OF REGISTERED MEMOS STORED IN MEMORY S6
IS NUMBER OF REGISTERED MEMOS LARGER THAN NUMBER OF DISPLAYED MEMOS? S8
NO
MAINTAIN STATE OF IDLE SCREEN S22
END
YES
SET COLORS WITH DIFFERENT TONES TO MEMOS S10
SCROLL MEMOS S12
DETERMINE PRIORITY OF MEMOS S14
IS PRIORITY COINCIDENT WITH ORDER OF ARRANGEMENT? S16
YES
DISPLAY MEMOS IN SAME ORDER OF ARRANGEMENT AS THAT BEFORE SCROLLING S24
END
NO
MOVE MEMOS S18
DISPLAY MEMOS IN DESCENDING ORDER OF PRIORITY S20
END

MOBILE ELECTRONIC DEVICE, DISPLAY CONTROL METHOD AND STORAGE MEDIUM STORING DISPLAY CONTROL PROGRAM

CROSS-REFERENCE TO RELATED APPLICATION

This application is a National Stage of PCT international application Ser. No. PCT/JP2011/056297 filed on Mar. 16, 2011 which designates the United States, incorporated herein by reference, and which is based upon and claims the benefit of priority from Japanese Patent Application No. 2010-059511, filed on Mar. 16, 2010.

FIELD

The present disclosure relates to a mobile electronic device, a display control method and a storage medium storing a display control program.

BACKGROUND

A mobile phone that is an example of mobile electronic devices displays an idle screen (a screen when the mobile phone is switched on and not during a call) on a display unit, for example. Some of such mobile phones display objects such as memo information in which text is described laid on (attached to) the idle screen (see Patent Literature 1).

In a mobile electronic device, a user registers objects that can be displayed on an idle screen and objects are thereby stored in a storage unit. Then, a desired object out of the objects stored in the storage unit is displayed on the idle screen.

CITATION LIST

Patent Literature

Patent Literature 1: Japanese Patent Application Laid-Open No. 2005-51316

Technical Problem

With a mobile electronic device of related art, the arrangement of objects when displayed on the display unit is set uniquely, and there are cases where the objects are not optimally arranged for the user.

For the foregoing reasons, there is a need for a mobile electronic device, a display control method and a display control program capable of displaying a plurality of objects in various arrangements.

SUMMARY

According to an aspect, a mobile electronic device includes a display unit having a display area for displaying a plurality of objects; and a control unit for controlling display of the objects in the display area. When the objects displayed in a first arrangement in the display area are moved outward from inside the display area and then displayed again in the display area, the control unit displays the objects in a second arrangement.

According to another aspect, the mobile electronic device further includes a storage unit for storing priority levels set to the respective objects. The control unit displays the objects again in an arrangement according to the priority levels as the second arrangement.

According to another aspect, the mobile electronic device further includes an operating unit for performing an operation to select any of the objects. The control unit sets the priority levels of the objects on a basis of frequency of selecting operations via the operating unit.

According to another aspect, the mobile electronic device further includes an operating unit for performing an operation to select any of the objects. The control unit sets the priority levels of the objects on a basis of time last selected via the operating unit.

According to another aspect, the control unit scrolls the objects when the objects are moved outward from inside the display area.

According to another aspect, when the objects displayed in the first arrangement are moved toward a first end of the display area and then moved from a second end that is opposite to the first end into the display area, the control unit displays the objects again in the second arrangement.

According to another aspect, the mobile electronic device further includes a housing; and a detection unit for detecting tilting of the housing. The control unit moves the objects according to tilting detected by the detection unit.

According to another aspect, the mobile electronic device further includes an operating unit for performing an operation to select any of the objects; and a storage unit for storing a plurality of application programs each of which is associated with each of the objects. When one of the objects is selected via the operating unit, the control unit activates an application associated with the object.

According to another aspect, when the objects are displayed again in the second arrangement, the control unit displays the objects so that color thereof becomes darker in an order of arrangement.

According to another aspect, the control unit displays the objects over a standard screen, and when a display screen is switched from a screen other than the standard screen to the standard screen, the control unit scrolls the objects on the standard screen.

According to another aspect, a display control method includes displaying a plurality of objects in a display area of a display unit; moving the objects displayed in a first arrangement in the display area outward from inside the display area; and displaying the objects moved outward of the display area in a second arrangement.

According to another aspect, according to the present invention, a display control program causes a mobile electronic device to execute: displaying a plurality of objects in a display area of a display unit; moving the objects displayed in a first arrangement in the display area outward from inside the display area; and displaying the objects moved outward of the display area in a second arrangement.

Advantageous Effects of Invention

According to the present invention, a plurality of objects can be displayed in various arrangements.

DESCRIPTION OF EMBODIMENTS

==Configuration of Mobile Phone==

Figure 1A:
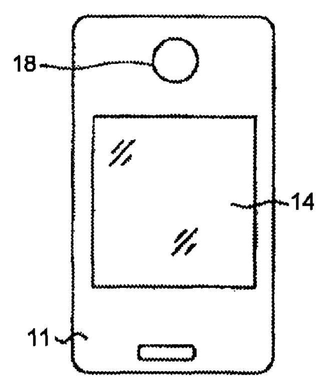
FIG. 1A is a diagram illustrating an example of external appearance of a mobile phone in a closed state.
Figure 1B:
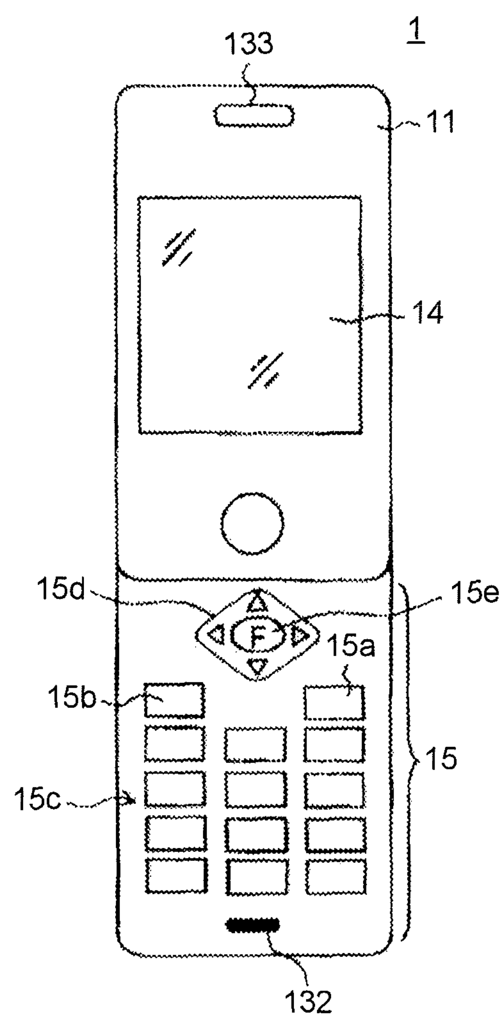
FIG. 1B is a diagram illustrating an example of external appearance of the mobile phone in an open state.
Figure 2:
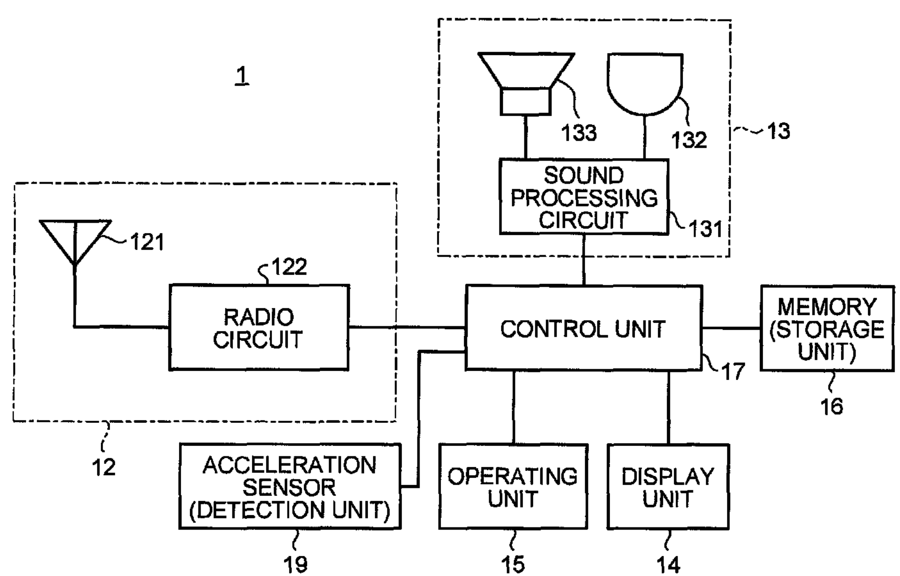
FIG. 2 is a diagram illustrating an example of a system configuration of the mobile phone.

FIGS. 1A and 1B are external views of a mobile phone body according to the present embodiment, in which FIG. 1A illustrates an external view in a closed state and FIG. 1B illustrates an external view in an open state. FIG. 2 is a block diagram illustrating an exemplary configuration of main circuits of the mobile phone according to the present embodiment.

As illustrated in FIGS. 1A and 1B and 2, a mobile phone 1 includes a body housing 11, a communication unit 12, a sound processing unit 13, a display unit 14, an operating unit 15, a memory 16 as a storage unit, a control unit 17 that is an example of a control unit, a movable mechanism 18, and an acceleration sensor (detection unit) 19 that is an example of a tilt detection unit.

The communication unit 12 includes a transmitting/receiving antenna 121 and a radio circuit 122. The transmitting/receiving antenna 121 is built in the body housing 11 at a side where the display unit 14 is provided. The radio circuit 122 modulates sound information, IDs, web page data browsing request information and the like processed by the control unit 17 and transmits the modulated information to a base station that is not illustrated through the transmitting/receiving antenna 121 so as to perform wireless communication utilizing radio waves. The radio circuit 122 also demodulates various information such as page data and sound information transmitted wirelessly from a base station and received by the transmitting/receiving antenna 121, and outputs the demodulated information to the control unit 17.

The sound processing unit 13 includes a sound processing circuit 131 to which a microphone 132 that is an example of an input unit for performing voice input and a speaker 133 for performing voice output are connected for a call function. The sound processing circuit 131 performs predetermined processing on a sound input from the microphone 132 and supplies the processed sound to the control unit 17. The sound processing circuit 131 has a function of a recognition unit that recognizes voice input from the microphone 132. The sound processing circuit 131 also performs predetermined processing on sound information supplied from the control unit 17 and outputs the processed information through the speaker 133.

As illustrated in FIG. 1B, the microphone 132 is positioned below the operating unit 15 and the speaker 133 is positioned above the display unit 14 of the body housing 11.

The display unit 14 includes a display device such as a liquid crystal display (LCD) arranged at an upper part of the body housing 11 as illustrated in FIG. 1B, and displays a telephone number input for the call function, memos such as various messages and text data, etc. Part of the display unit 14 corresponding to one line at the top is used as a guide display line for displaying a mode type, a radio field strength, a remaining battery level and the like.

In particular, the display unit 14 according to the present embodiment can display a plurality of windows called attached memos (an example of objects operated on the screen) having predetermined sizes on the idle screen (standby display) over background display of the idle screen under control by the control unit 17. The idle screen refers to a screen when the mobile phone is switched on and not during a call. The idle screen may also be called a standard screen, an initial screen, a desktop screen, a home screen, or wallpaper, for example.

As illustrated in FIG. 1B, the operating unit 15 is arranged at a lower part of the body housing 11 and includes an end (clearing)/power key 15*a*, a start (calling) key 15*b*, a plurality of numerical keys 15*c* associated with numbers and the like, up, down, left and right keys 15*d*, a center key 15*e*, and the like.

The memory 16 includes an EEPROM, for example, and stores therein control programs for calls and/or transmission/reception of mail messages, an Internet browser, message data, an address book in which names and phone numbers are registered, etc. The memory 16 also stores therein application programs to be executed by the control unit 17.

The memory 16 further stores therein attached memo data (an example of object data) corresponding to respective attached memos. The attached memo data are composed of data registered as attached memos each of which being associated with displayed text data to be displayed in a window, symbol data, window display position data in addition to link data for the data.

The displayed text data are text data determined according to predetermined priority among text data included in various data or part thereof stored in the memory 16 and selected by a user through the operating unit 15. An upper limit is set to the amount of text data displayed in windows displayed on the display unit 14. Since the upper limit is eight characters in the present embodiment, top eight characters of the determined text data become the displayed text data.

The symbol data is used for identifying a symbol displayed in addition to an attached memo when the attached memo is displayed on the display unit 14 so that the user can easily identify the attribute of the memo. The symbol data are associated with a symbol such as image data and an icon that is stored separately from the symbol data.

The control unit 17 is mainly constituted by a microcomputer and performs the integral control of the mobile phone 1. For example, the control unit 17 performs control on wireless transmission/reception of various information by the communication unit 12, processing of sound information for the sound processing unit 13, control on display of information to the display unit 14, processing according input information of the operating unit 15, and access control to the memory 16 according to the processing.

The control unit 17 has functions of a display control unit that controls display of attached memos attached on the idle screen. In the present embodiment, the control unit 17 performs display control of attached memos according to the tilt of the mobile phone body (details of the control will be described later).

The movable mechanism 18 horizontally turnably supports a portion (at a side including the display unit 14) of the body housing 11 and another portion (at a side including the operating unit 15) of the body housing 11. Accordingly, the side of the display unit of the body housing 11 can be horizontally turned in one direction so that the mobile phone can become the open state as in FIG. 1B from the closed state as in FIG. 1A, for example.

The acceleration sensor (detecting unit) 19 is for detecting tilting of the mobile phone body that is the device body. The mobile phone 1 may include another sensor such as a gyro sensor as the detection unit.

==Display Control of Attached Memos According to Tilting of Mobile Phone Body==

As described above, a plurality of attached memos are attached on the idle screen. Since the display area of the idle screen of the mobile phone 1 is limited (small), however, only attached memos corresponding to some of attached memo data among registered attached memo data can be display on the idle screen when the number of memo data (memo information pieces) registered in the memory 16 is large. Accordingly, in the related art, a registration screen of attached memos (a screen different from the idle screen) needs to be displayed so as to check attached memos other than some attached memos mentioned above.

Figure 3:
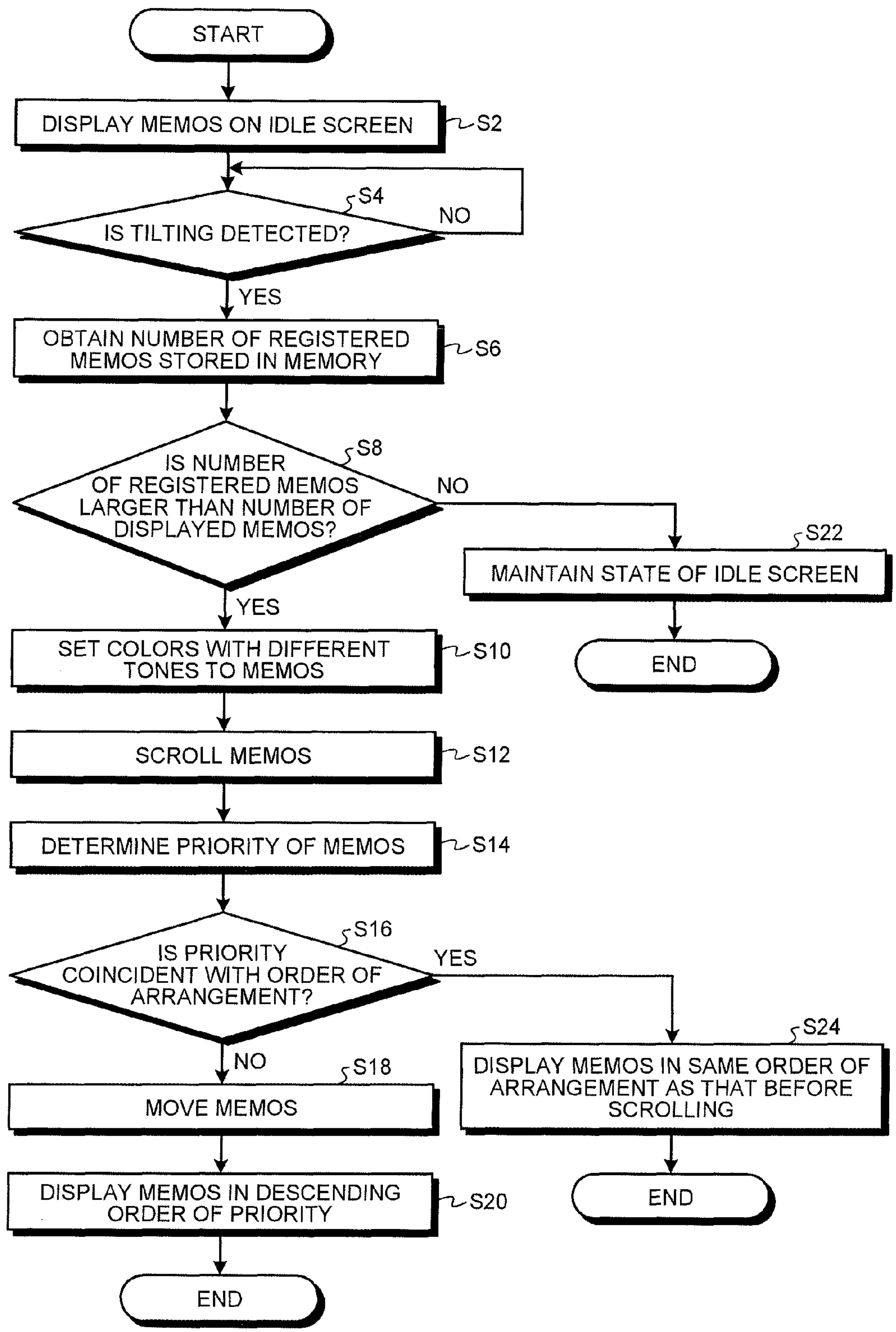
FIG. 3 is a flowchart for explaining display control of attached memos.
Figure 4:
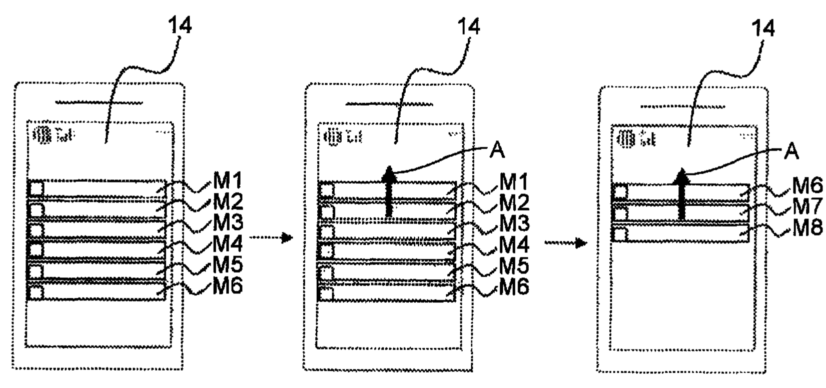
FIG. 4 is a state transition diagram of a display unit.
Figure 4:
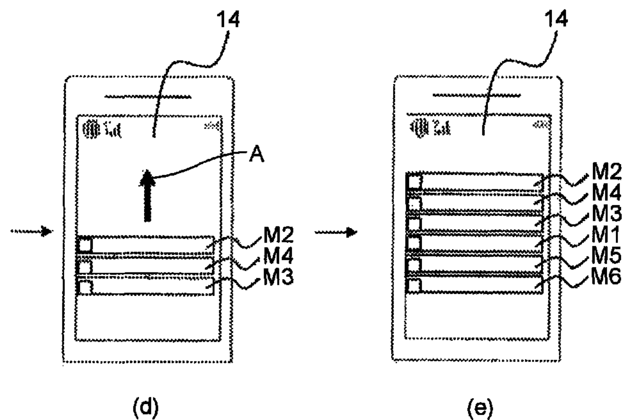

The mobile phone 1 of the present embodiment, therefore, performs display control of attached memos as will be described below so that the user can easily recognize attached memos that are registered in the memory 16 but not displayed on the idle screen. FIG. 3 is a flowchart for explaining display control of attached memos according to tilting of the mobile phone body. FIG. 4 is a state transition diagram of the display unit 14.

The display control illustrated in FIG. 3 starts from display of an idle screen on the display unit 14 by the control unit 17 (Step S2). In the present embodiment, it is assumed that a plurality of (six) attached memos M1 to M6 are displayed such that they are vertically arranged and attached to (overlaid on) the idle screen as illustrated in (a) of FIG. 4. In the present embodiment, it is assumed that up to six attached memos can be displayed at a time on the idle screen. The arrangement order of the attached memos M1 to M6 is stored in the memory 16 in advance.

Then, the control unit 17 detects tilting of the mobile phone body (Step S4). Specifically, the control unit 17 detects whether or not the mobile phone body is tilted for a predetermined time by means of the acceleration sensor 19. When tilting of the mobile phone body is detected (Step S4: Yes), the control unit 17 obtains the number of attached memo data registered in the memory 16 (hereinafter may also be referred to as the number of registered memos) (Step S6).

Subsequently, the control unit 17 determines whether the number of registered memos registered in the memory 16 is larger than the number of attached memos that can be displayed at a time on the idle screen (hereinafter may also be referred to as the number of displayed memos) (Step S8). When the number of registered memos is not larger than the number of displayed memos (Step S8: No), the control unit 17 maintains the state of the idle screen illustrated in (a) of FIG. 4, that is, does not scroll the attached memos on the idle screen (Step S22). It is thus possible to prevent unnecessary scrolling.

On the other hand, when the number of registered memos is larger than the number of displayed memos (Step S8: Yes), the control unit 17 scrolls attached memos corresponding to attached memo data registered in the memory 16 by sequentially moving the attached memos on the idle screen as will be described below. In the present embodiment, the scrolling of the attached memos will be described assuming that the number of registered memos registered in the memory 16 is eight (attached memos M1 to M8). Accordingly, the objects to be scrolled are not the attached memos M1 to M6 illustrated in (a) of FIG. 4 but the attached memos M1 to M8 corresponding to the attached memo data stored in the memory 16.

First of all, the control unit 17 sets colors with different tones from one another to the attached memos M1 to M8 (Step S10). The tone of colors becomes darker in the order of the attached memos M1, M2, M3 .... In other words, the tone of the colors gradually changes in units of memos. As a result of setting colors with different tones to the memos, the user can recognize the progress of scrolling when the attached memos are scrolled, for example.

Subsequently, the control unit 17 moves the attached memos M1 to M8 with colors in the direction of an arrow A illustrated in (b) of FIG. 4 to scroll the attached memos M1 to M8 (Step S12). The arrow A is illustrated for explanation but the arrow A is not actually displayed on the display unit 14. As a result, the attached memos M7 and M8 that are not displayed in the state of (a) of FIG. 4 are displayed in a scrolling manner as illustrated in (c) of FIG. 4. The user can thus recognize the attached memos M7 and M8 that are registered in the memory 16 but are not attached to the idle screen. As illustrated in (c) of FIG. 4, attached memos are sequentially deleted from an end (a first end) of the screen as a result of scrolling.

The control unit 17 determines the display priority of the attached memos M1 to M8 while the attached memos M1 to M8 are scrolled (Step S14). For example, the control unit 17 sets higher display priority to attached memos that are more frequently selected (memos with larger number of clicks). Alternatively, the control unit 17 may set higher display priority to attached memos in which time nearer to the current time is described. Still alternatively, higher display priority may be set to attached memos relating to an application executed immediately before detection of tilting, for example. Information such as selection frequency is stored in the memory 16.

Subsequently, the control unit 17 determines whether or not the order of arrangement according to display priority of the attached memos determined at Step S14 is coincident with the order of arrangement of the attached memos illustrated in (a) of FIG. 4 (Step S16). When it is determined that the orders of arrangement are coincident (Step S16: Yes), the control unit 17 moves the attached memos M1 to M6 to be displayed in the arrangement as illustrated in (a) of FIG. 4 (Step S24).

When it is determined that the orders of arrangement are not coincident at Step S16 (No), the control unit 17 arranges the attached memos M1 to M8 in an arrangement in the order according to the priority to be displayed. Specifically, it is assumed that the priority of the attached memos M2, M3 and M4 is determined to be high, the priority of the attached memos M1, M5 and M6 is determined to be medium, and the priority of the attached memos M7 and M8 is determined to be low.

Then, the control unit 17 moves only the attached memos M1 to M6 with higher priority among the attached memos M1 to M8 upward from a lower portion of the screen (an end opposite to the first end) after scrolling as illustrated in (d) of FIG. 4 (Step S18). Thus, the attached memos that have once been deleted from the screen are displayed again.

Subsequently, the control unit 17 displays the attached memos M1 to M6 in an arrangement in descending order of the priority as illustrated in (e) of FIG. 4 (Step S20). As a result, the order of arrangement of the attached memos M1 to M6 is changed according to the priority between before and after scrolling. Since the attached memos M1 to M6 are arranged in descending order of the priority, the user can easily recognize a desired attached memo (an attached memo with higher priority).

In the above description, the priority of the attached memos M7 and M8 are low; however, when the priority of the attached memo M7 is high, for example, the attached memo M7 will be displayed on the idle screen instead of any one of the attached memos M1 to M6 after scrolling. As a result, the attached memo M7 that has a high priority but is not attached to the idle screen by the user will be automatically attached to the display screen after scrolling. The user can thus skip such an operation of displaying a registration screen for checking the attached memo M7 with high priority as in the related art.

In the above description, an embodiment in which the attached memos M1 to M8 are all once deleted from the screen and then displayed again on the idle screen during scrolling is presented; however, embodiments are not limited thereto. For example, when the attached memos M7 and M8 are positioned at an upper portion of the screen as illustrated in (c) of FIG. 4, the control unit 17 may display the attached memos once deleted on a lower portion of the screen. In such a case, the scrolling time for the attached memos is reduced.

Other Embodiments

A mobile phone as an embodiment has been described. The above embodiment is provided to facilitate understanding of the present invention but not to lead to limited interpretation of the present invention. Needless to say, the present invention can be modified and improved without departing from the scope thereof, and equivalents thereof are included in the present invention. In particular, embodiments described below are also included in the present embodiment.

While a mobile phone 1 is described as the mobile electronic device in the embodiment described above, the mobile electronic device is not limited to mobile phones but may be PHSs (personal handy phone systems), PDAs (personal digital assistants), portable navigation devices, electronic dictionary devices, and laptop computers, for example.

While the mobile phone 1 has a structure that can be horizontally turned as illustrated in FIGS. 1A and 1B in the embodiment described above, the structure is not limited thereto. For example, the mobile phone 1 may be a folding type mobile phone, a sliding type mobile phone, or a straight type (slate type) mobile phone formed of one housing.

While the scrolling direction of the attached memos is the direction of the arrow A illustrated in (b) of FIG. 4 in the embodiment described above, the scrolling direction is not limited thereto. For example, the attached memos may be scrolled either in the direction of the arrow A illustrated in FIG. 4 and in the direction opposite thereto depending on the tilting direction of the mobile phone body.

While the attached memos M1 to M8 are scrolled after tilting of the mobile phone 1 is detected in a state in which the idle screen is displayed in the embodiment described above, the control of scrolling is not limited thereto. For example, the attached memos may be scrolled when one application being executed is terminated (or suspended) and the display is accordingly switched from the screen for the application to the idle screen.

While the objects to be scrolled are the attached memos in the embodiment described above, the objects to be scrolled are not limited to attached memos. For example, the objects to be scrolled may be icons, images or incoming and outgoing call history instead of attached memos.

While the attached memos are scrolled in the direction in which the mobile phone is tilted detected by the acceleration sensor 19 in the embodiment described above, the control of scrolling is not limited thereto. For example, the attached memos may be scrolled when it is detected by the acceleration sensor 19 that the mobile phone body is shaken by the user.

In an embodiment in which the objects are icons, an application program associated with an icon may be executed by the control unit 17 when the icon is selected via the operating unit 15. In this embodiment, the control unit 17 may set the display priority higher to objects more frequently selected. In this embodiment, the control unit 17 may set the display priority higher to objects with later selected time. In this embodiment, in a case where execution of an application program associated with an icon selected on a standard screen on which the icons are arranged is terminated and the display screen is thus switched from a screen other than the standard screen to the standard screen, icons may be scrolled on the standard screen.

The invention claimed is:

1. A mobile electronic device, comprising:
- a display unit having a display area for displaying a plurality of objects; and
- a control unit configured to
  - display the objects in a first arrangement in the display area,
  - move the objects displayed in the first arrangement outward from inside the display area, and
  - display the objects moved outward of the display area again in the display area in a second arrangement,
- wherein
- the control unit is configured to
  - move the objects displayed in the first arrangement outward from inside the display area at a first end of the display area, and
  - display the objects moved outward of the display area again in the display area from a second end of the display area in the second arrangement.

2. The mobile electronic device according to claim 1, further comprising:
- a storage unit for storing priority levels set to the respective objects,
- wherein the control unit is configured to display the objects in the second arrangement according to the priority levels.

3. The mobile electronic device according to claim 2, further comprising:
- an operating unit for accepting an operation to select any of the objects,
- wherein the control unit is configured to set the priority levels of the objects on a basis of frequency of selecting operations via the operating unit.

4. The mobile electronic device according to claim 2, further comprising:
- an operating unit for accepting an operation to select any of the objects,
- wherein the control unit is configured to set the priority levels of the objects on a basis of time last selected via the operating unit.

5. The mobile electronic device according to claim 1, wherein
- the control unit is configured to scroll the objects when the objects are moved outward from inside the display area.

6. The mobile electronic device according to claim 1, further comprising:
- a detection unit for detecting tilting of the mobile electronic device,
- wherein the control unit is configured to move the objects according to tilting detected by the detection unit.

7. The mobile electronic device according to claim 1, further comprising:
- an operating unit for accepting an operation to select any of the objects; and
- a storage unit for storing a plurality of application programs each of which is associated with any of the objects,
- wherein, when one of the objects is selected via the operating unit, the control unit is configured to execute the application program associated with the object.

8. A mobile electronic device, comprising:

a display unit having a display area for displaying a plurality of objects; and a control unit configured to display the objects in a first arrangement in the display area, move the objects displayed in the first arrangement outward from inside the display area, and display the objects moved outward of the display area again in the display area in a second arrangement, wherein the control unit is configured to change colors of the objects according to an order of arrangement upon moving the objects outward from inside the display area.

9. A mobile electronic device, comprising:

a display unit having a display area for displaying a plurality of objects; and a control unit configured to display the objects in a first arrangement in the display area, move the objects displayed in the first arrangement outward from inside the display area, and display the objects moved outward of the display area again in the display area in a second arrangement, wherein the control unit is configured to display the objects over a first screen, and move the objects displayed in the first arrangement outward from inside the display area when a screen to be displayed on the display unit is switched from a second screen to the first screen.

10. A display control method, comprising:

displaying a plurality of objects in a first arrangement in a display area of a display unit;

moving the objects displayed in the first arrangement outward from inside the display area;

displaying the objects moved outward of the display area in a second arrangement in the display area; and storing a plurality of pieces of object data based on which the objects are displayed, wherein, when the number of the pieces of the object data is larger than the number of the objects displayed on the display unit, the objects displayed in the first arrangement and the objects, which are associated with the object data but have not been displayed, are moved outward from inside the display area on the display unit, and the objects, which are selected on a basis of priority from among the objects associated with the object data, are displayed in the display area in the second arrangement.

11. A non-transitory storage medium that stores a display control program for causing, when executed by a mobile electronic device, the mobile electronic device to execute:

displaying a plurality of objects in a first arrangement in a display area of a display unit;

moving the objects displayed in the first arrangement outward from inside the display area, wherein the objects displayed in the first arrangement are moved outward from inside the display area at a first end of the display area; and displaying the objects moved outward of the display area in a second arrangement in the display area, wherein the objects moved outward of the display area are displayed again in the display area from a second end of the display area in the second arrangement.

12. A mobile electronic device, comprising:

a display unit having a display area for displaying a plurality of objects;

a control unit configured to display the objects in a first arrangement in the display area, move the objects displayed in the first arrangement outward from inside the display area, and display the objects moved outward of the display area again in the display area in a second arrangement; and a storage unit for storing a plurality of pieces of object data based on which the objects are displayed, wherein when the number of the pieces of the object data is larger than the number of the objects displayed on the display unit, the control unit is configured to move the objects displayed in the first arrangement and the objects, which are associated with the object data but have not been displayed, outward from inside the display area on the display unit, and display the objects, which are selected on a basis of priority from among the objects associated with the object data, in the display area in the second arrangement.

* * * * *